(12) United States Patent
Tewes-Kampelmann

(10) Patent No.: US 11,197,425 B2
(45) Date of Patent: Dec. 14, 2021

(54) CUTTING BLADE OVERLAOD PROTECTION

(71) Applicant: B. Strautmann & Söhne GmbH U. Co. KG, Bad Laer (DE)

(72) Inventor: Andreas Tewes-Kampelmann, Bad Laer (DE)

(73) Assignee: B. Strautmann & Söhne GmbH u. Co. KG, Bad Laer (DE)

( * ) Notice: Subject to any disclaimer, the term of this patent is extended or adjusted under 35 U.S.C. 154(b) by 387 days.

(21) Appl. No.: 16/342,052

(22) PCT Filed: Oct. 23, 2017

(86) PCT No.: PCT/EP2017/077001
§ 371 (c)(1),
(2) Date: Apr. 15, 2019

(87) PCT Pub. No.: WO2018/077801
PCT Pub. Date: May 3, 2018

(65) Prior Publication Data
US 2019/0246564 A1    Aug. 15, 2019

(30) Foreign Application Priority Data

Oct. 27, 2016  (DE) .......................... 102016120528.1
Jul. 13, 2017  (DE) .......................... 202017104191.3

(51) Int. Cl.
*A01D 75/18*      (2006.01)
*A01D 90/04*      (2006.01)
*A01F 15/10*      (2006.01)

(52) U.S. Cl.
CPC ........... *A01D 75/182* (2013.01); *A01D 90/04* (2013.01); *A01F 2015/107* (2013.01); *A01F 2015/108* (2013.01)

(58) Field of Classification Search
CPC . A01D 75/182; A01D 90/04; A01F 2015/108; A01F 2015/107
See application file for complete search history.

(56) References Cited

U.S. PATENT DOCUMENTS 4,955,188 A * 9/1990 von Allworden ...... A01D 90/04
                                                    100/6
5,702,300 A * 12/1997 Wilson .................... A01F 12/16
                                                    460/106

(Continued)

FOREIGN PATENT DOCUMENTS

DE     1257473 B    12/1967
DE     3617003 A1   11/1986

(Continued)

OTHER PUBLICATIONS

WIPO, International Search Report (in the priority application), dated Jan. 23, 2018.

(Continued)

*Primary Examiner* — Arpad Fabian-Kovacs
(74) *Attorney, Agent, or Firm* — Laurence P. Colton; Smith Tempel Blaha LLC

(57) ABSTRACT

A cutting blade overload protection device for a cutting mechanism of a harvester for leaf and stalk material, having a cutting blade pivotable about a cutting blade rotational axis and which is connected to a toggle lever mechanism. The toggle lever mechanism includes two coupled toggle levers pivotable about a toggle lever rotational axis and which move the cutting blade from an operating position to a resting position when a predefined force is exceeded. To protect the cutting blade better when contacting foreign objects, the device has a toggle lever mechanism which comprises a stop limit and a spring element, with the spring element and limit stop interacting such that when a predefined force is exceeded, the toggle lever rotational axis is (Continued)

moved past a dead center point, with the position of the toggle levers shifting from a first buckling position through a straight position into a second buckling position.

15 Claims, 9 Drawing Sheets

(56) References Cited

U.S. PATENT DOCUMENTS

| | | | | |
|---|---|---|---|---|
| 5,974,776 A * | 11/1999 | Prellwitz | ............... | A01D 90/04 460/112 |
| 6,050,510 A * | 4/2000 | Bonnewitz | ............ | A01D 90/04 241/101.763 |
| 6,128,995 A * | 10/2000 | Geng | .................... | A01D 90/04 56/341 |
| 6,370,851 B1 * | 4/2002 | Uros | .................... | A01F 15/106 100/88 |
| 6,394,893 B1 * | 5/2002 | Scholz | .................. | A01D 90/04 460/6 |
| 6,594,983 B1 * | 7/2003 | Krone | .................... | A01D 90/04 56/341 |
| 6,912,835 B1 * | 7/2005 | Chabassier | ............ | A01D 90/04 241/243 |
| 7,584,594 B2 * | 9/2009 | Viaud | .................. | A01F 15/106 56/364 |
| 7,993,187 B2 * | 8/2011 | Ricketts | ................. | A01F 12/40 460/2 |
| 9,468,149 B2 * | 10/2016 | Derscheid | ............ | A01D 89/001 |
| 9,913,433 B2 * | 3/2018 | Singh | .................... | A01F 29/095 |
| 10,462,974 B2 * | 11/2019 | Schinstock | ............ | A01D 90/04 |
| 2008/0028737 A1 * | 2/2008 | Viaud | .................. | A01F 15/106 56/341 |
| 2009/0272089 A1 * | 11/2009 | Lucot | ................... | A01F 15/106 56/131 |
| 2014/0179383 A1 * | 6/2014 | Isaac | ...................... | A01F 12/40 460/112 |
| 2016/0029567 A1 * | 2/2016 | Meiners | ................. | A01F 29/01 56/500 |
| 2017/0099771 A1 * | 4/2017 | Linde | ................. | A01D 41/1243 |
| 2018/0027742 A1 * | 2/2018 | Schinstock | ............ | A01F 15/10 |

FOREIGN PATENT DOCUMENTS

| | | | | |
|---|---|---|---|---|
| DE | 3625512 A1 * | 2/1988 | ............ | A01D 90/04 |
| DE | 9105451 U1 | 9/1992 | | |
| DE | 4302199 A1 * | 7/1994 | ............ | A01F 15/10 |
| DE | 19841598 A1 * | 3/2000 | ............ | A01D 90/04 |
| DE | 20319680 U1 | 3/2004 | | |
| DE | 102013007304 A1 | 10/2014 | | |
| DE | 202017100339 U1 * | 1/2017 | ............ | A01D 90/04 |
| EP | 0028395 A1 | 5/1981 | | |
| EP | 1584226 A2 * | 10/2005 | ............ | A01D 90/04 |
| EP | 2910105 B1 | 8/2015 | | |
| GB | 2095638 A * | 10/1982 | ............ | A01D 90/04 |
| GB | 2095638 A | 10/1982 | | |

OTHER PUBLICATIONS

WIPO, International Report on Patentability (in the priority application), dated Oct. 19, 2018.

WIPO, International Preliminary Report on Patentability (in the priority application), dated Feb. 11, 2019.

Deutsches Patent—Und Markenamt (German Patent and Trademarks Office), Recherchenbericht (search in a priority application), Jul. 3, 2017.

* cited by examiner

CUTTING BLADE OVERLAOD PROTECTION

CROSS REFERENCE TO RELATED APPLICATIONS

This application is the US National Phase of, and claims the benefit of and priority on, International Application No. PCT/EP2017/077001 having an international filing date of 23 Oct. 2017, which claims priority on and the benefit of German Patent Application No. 10 2016 120 528.1 having a filing date of 27 Oct. 2016 and German Patent Application No. 20 2017 104 191.3 having a filing date of 13 Jul. 2017.

BACKGROUND OF THE INVENTION

Technical Field

The invention relates to a toggle lever mechanism comprising two coupled toggle levers which can pivot about a toggle lever rotational axis and which can be moved out of an operating position into a resting position when a predefined force acting on the toggle lever mechanism is exceeded.

The invention further relates to a cutting blade overload protection device for a cutting mechanism of a harvester for leaf and stalk material, comprising at least one cutting blade that is pivotable about a cutting blade rotational axis and which is connected to such a toggle lever mechanism. The toggle lever mechanism comprises two coupled toggle levers that are pivotable about a toggle lever rotational axis and which move the cutting blade from an operating position to a resting position when a predefined force has been exceeded. The predefined force acts on the toggle lever mechanism and is induced by a torque applied about the cutting blade rotational axis. This torque is in turn induced by forces acting on the cutting blade from the harvested material during the operation of the harvester and by any foreign object present in the harvested material.

The invention also relates to a harvester equipped with at least one such cutting blade overload protection device or to such a toggle lever mechanism.

Prior Art

A toggle lever mechanism is understood as comprising an arrangement of two single-arm levers connected to one another by a joint (toggle) and which are likewise hinge-mounted at their ends. The toggle lever rotational axis is understood as the common rotational axis of the two levers in the toggle.

Known from DE 203 19 680 U1 is a cutting blade overload protection device for a cutting mechanism of a harvester for leaf and stalk material in which the toggle lever mechanism is connected with two toggle levers which pivot about a toggle lever rotational axis. When a predefined force is exceeded, a cutting blade coupled to the toggle lever mechanism is moved out of an operating position into a resting position. In the operating position, the center lines of the two toggle levers are at a slight angle to one another. When the predefined force is exceeded, the toggle lever mechanism buckles in and the angle between the toggle lever center lines increases. Resulting from the initially small angle in the operating position is a short lever arm that requires a relatively large force for causing the toggle lever mechanism to buckle. Without at least a minimal angle between the two toggle lever center lines, a buckling of the toggle lever mechanism would not be possible regardless of the magnitude of the exerted force.

Known from DE 91 05 451 U1 is a cutting blade overload protection device for a cutting mechanism of a harvester in which the toggle lever mechanism in the cutting blade's operating position likewise forms a small lever arm for a force required for moving the cutting blade out of its position.

Also known from EP 0 028 395 A1 is a cutting blade overload protection device with a toggle lever mechanism and a small lever arm effective in the working position. In order to achieve a rapid and secure return of a cutting blade that has been moved out of its operating position, a spring can be provided which increases its restoring force the more the cutting blade is swung out of position.

GB 2 095 638 A likewise discloses a cutting blade overload protection system with a blade safety device in which a spring effects a restoring force after a cutting blade has been swung out of its operating position.

Known from DE 15 57 473 B is a cutting mechanism having a toggle lever mechanism in which the two toggle levers form a locked position for fixing the cutting blade when it is in its operating position. No provision is made for swinging the cutting blade out of its position during operations. The toggle lever mechanism is provided in order that the cutting blade can be swung into a resting position if required by actuating a lever manually.

Known from EP 2 910 105 B1 is a cutting blade overload protection device having a toggle lever mechanism where the lever arrangement in a support position supports the cutting blade against a predetermined pretension force. When this pretension force is exceeded on account of an overload, the cutting blade can be moved out of the support position and thus out of its cutting position. In the case of this cutting blade overload protection device, the lever arrangement is realized as a toggle lever mechanism having two toggle levers that are pivotably connected to one another at their longitudinal ends by means of a toggle joint. The toggle joint is in a minimally flexed position of just slightly under 180°, which is designated in EP 2 910 105 B1 as the "straight position of the toggle levers", and can be put into an abutment position under the biasing force implementing biasing. This results in a support position, out of which the toggle lever can be moved by folding of the toggle lever mechanism in order to permit the deflection of the cutting blade out of the cutting position. The folding action is made counter to the biasing force and away from the abutment state in the toggle joint.

The minimal flexion of the toggle lever results in a short lever arm which supports the cutting blade against the load exerted by the conveying of the harvested product. In the absence of this minimal flexion and the resulting lever, the three joints of the toggle lever mechanism would lie in a single line, with the result that a load acting on the cutting blade would not allow the toggle lever mechanism to fold but would instead lock it in a blocked position.

The very small lever arm provided in EP 2 910 105 B1 with minimal flexion of the toggle lever means that a relatively large biasing force can be provided toward the cutting position of the cutting blade. When this biasing force is exceeded, the cutting blade starts to move out of the cutting position and the toggle levers start to buckle. Due to the additional buckling of the toggle levers, the lever arm increases in size and with it the load acting against the biasing force. The toggle levers continue to buckle, or completely buckle, thus deflecting the cutting blade out of the cutting position.

This lever arrangement has the disadvantage that, after the release of the blade safety device, the amount of force required for further deflection is certainly reduced, but a restoring force acting against the release load is exerted by the pretensioned spring for generating the biasing force during the entire deflection action. This may allow foreign objects to damage the cutting blade not only at the point of first contact between foreign objects and the cutting blade, but can also extend across a relatively large portion of the blade.

BRIEF SUMMARY OF THE INVENTION

The object of the invention is to make use of the self-locking effect of a toggle lever system which arises under certain conditions for the formation of a locking position and to provide means by which the self-locking effect can be overcome and the toggle lever mechanism can be moved past a dead point. A further objection of the invention is to propose a cutting blade overload protection device having such a toggle lever mechanism in order to provide improved protection against damage to the cutting blade.

This object is achieved by a toggle lever mechanism comprising two toggle levers that are coupled to one another and pivotable about a toggle lever rotational axis and which can be moved from an operating position to a resting position when a predefined force acting on the toggle lever mechanism has been exceeded, and further comprising a limit stop and a spring element, characterized in that the limit stop forms a guide element which is in contact with a toggle lever and the toggle lever contacting the limit stop includes a guide track in the form of an inclined plane along which the limit stop can slide or roll, with spring element and limit stop interacting such that when the predefined force is exceeded, the toggle lever rotational axis is moved past a dead center point and the position of the toggle levers shifts from a first buckling position to a second buckling position, which thus comprises a limit stop and a spring element, with the limit stop and spring element interacting such that when a predefined force is exceeded, the toggle lever rotational axis is moved past a dead center point and the position of the toggle levers shifts from a first buckling position to a second buckling position.

The object of the invention is also achieved by a cutting blade overload protection device for a cutting mechanism of a harvester for leaf and stalk material, comprising at least one cutting blade that is pivotable about a cutting blade rotational axis and a toggle lever mechanism as disclosed herein with which the cutting blade can be moved from an operating position to a resting position when a predefined force has been exceeded.

A toggle lever mechanism is understood as a system of two toggle levers placed end-to-end and connected to each other by means of a common joint. This common joint is also referred to in the following as a toggle lever swivel joint or toggle joint. In addition to the common toggle joint, the two toggle levers, which in the following will be designated as first toggle lever and second toggle lever, have at their respective outer ends a further joint, which will be referred to as the outer joint of the first toggle lever and the outer joint of the second toggle lever.

The invention makes use of a well-known toggle lever mechanism in a manner completely different than the known prior art device. According to the invention, the toggle lever is not only used to transfer a large force using a short toggle lever. The toggle lever mechanism according to the invention makes use of the self-locking effect of a toggle lever system which arises under certain conditions for the formation of a locking position and provides means for overcoming the self-locking effect and which can also move the toggle lever mechanism past a dead point. As a result of this, a cutting blade equipped with such an overload protection can be deflected from its operating position in the cutting channel into a resting position when acted upon by a predefined force.

A dead point is understood as a position in which the toggle lever mechanism is in an unstable equilibrium state. What is essential for this unstable equilibrium state is that no buckling force acts on the toggle joint of the toggle lever mechanism in either of the two buckling directions possible in this state or that any buckling forces acting on the toggle joint cancel each other out. The two possible buckling directions can also be designated as a pressure buckling direction and a deflection buckling direction. The pressure buckling direction is that direction in which the toggle lever mechanism presses against a limit stop, thus causing the cutting blade to be held in its operating position. The deflection buckling direction is that buckling direction in which the toggle lever mechanism buckles when the cutting blade protection device is triggered, thus assuming its resting position.

In the case of the system employed by the invention, a resultant force FR transmitted by the cutting blade to the toggle lever mechanism is exerted on one of the two toggle levers—and thus on the toggle lever mechanism as a whole. The force acting on the cutting blade comprises the load exerted on the blade during the harvesting operation. This load increases when a foreign object is present in the harvested material and is pressed against the cutting blade. The overall force acting on the cutting blade is transmitted as the resultant force FR into the toggle lever mechanism. In the process, the force FR is transmitted to a toggle lever and transferred therefrom to the toggle joint. Force FR is thus passed on to the toggle joint as force FR' and can be broken down into two components:

- a pressure or compression force component FK, which acts in the direction of the second toggle lever, and
- a lateral or buckle force component FN, which tends to cause the two toggle levers to buckle in one direction or the other.

The magnitude and direction of the buckle force acting in the toggle joint is dependent on the force FR acting on the toggle lever mechanism. According to the invention, in the case of a small force FR, the buckle force initially ensures that the cutting blade is held in its working position during operation. With increasing force exerted on the cutting blade, the force FR acting on the toggle lever mechanism also changes its magnitude. This leads to a reduction in the buckle force, in other words, the force responsible for holding the cutting blade in its working position. When a predefined magnitude of force FR is attained, the buckle force is reduced to zero and the toggle lever mechanism is in the dead center position. In the following, this predefined force in the dead center position will be referred to as force F1. A further increase of force FR beyond force F1 causes a reversal in the effective direction of the buckle force and a triggering of the cutting blade safety device.

In the case of a simple prior art toggle lever mechanism lacking additional support for a toggle lever, the two toggle levers coupled to one another at the toggle joint can basically—with respect to a straight position of these two toggle levers to one another—be buckled in two opposite directions. If the overall toggle lever mechanism is mounted at only two points, namely the outer end of the first toggle lever and the outer end of the second toggle lever, the straight position of the two toggle levers represents a dead center position. A force introduced into the upper or lower hinge point and acting in the axial direction of the toggle lever situated in a straight position does not cause any lateral force to act upon the toggle joint in the buckling direction. Thus, in a system without support in the straight position, the two toggle levers buckle in neither of the two possible buckling directions.

The toggle lever mechanism according to the invention includes an additional support of at least one of the two toggle levers at a point provided for such support. This support permits the two toggle levers to buckle in one direction only, namely in the deflection buckling direction. To this end, the lateral force acting in the toggle joint must be oriented in the direction of said deflection buckling direction. If the lateral force acts in the opposite direction, in other words in the pressure buckling direction, this lateral force of the contact pressure is exerted against the limit stop and the cutting blade is held in its operating position.

The buckle force component is reduced due to a change in the lever position by the compression exerted by the compression component on the spring element integrated in the toggle lever mechanism and/or by the guide element interacting with the inclined plane provided on the toggle lever.

In terms of the forces acting in the toggle joint, this system has three possible states:

In a first state, the lateral force acting at the toggle joint is directed against the provided deflection buckling direction. The toggle lever mechanism tends to buckle counter to the intended deflection buckling direction, but is supported against this by a stop provided as a counter bearing. The lateral force acting in the toggle joint is thus transmitted to the stop as pressing force. This first state can be realized when the toggle levers are at different positions relative to one another. The position in which the two toggle levers are in the first state will be referred to as the first buckling position. The angle between the two toggle levers in the first buckling position is greater than 180°.

In a second state, no forces acting in the toggle joint are present. Thus, no additional pressing force is exerted on the limit stop by the toggle joint or any force acting there. However, there is also no lateral force present which acts in the buckling direction. Instead, the toggle lever mechanism finds itself in an unstable equilibrium state and thus in the dead center position.

In a third state, the lateral force acting in the toggle joint is oriented in the provided deflection buckling direction. The toggle lever mechanism tends to buckle and indeed does buckle since no limit stop is present against which the lateral force acting in the deflection buckling direction could be supported.

The third state can also be realized in various positions of the toggle levers relative to one another. The position in which the two toggle levers are in the third state will be referred to as the second buckling position.

In the cutting blade overload protection device according to the invention, the toggle lever mechanism is coupled to the cutting blade by means of the first toggle lever. During operations, the harvested material presses against the cutting blade and is cut by the latter. In the process, force is exerted by the harvested material on the cutting blade. The force acting on the cutting blade is transmitted via the coupling point between the cutting blade and the first toggle lever to the toggle lever mechanism as the resultant force FR mentioned above. This resultant force FR has a force component which acts in the toggle joint in the axial direction of the second toggle lever, and a further force component which acts in the toggle joint in the lateral direction (pressure or deflection buckling direction).

In the cutting blade overload protection device according to the invention, the force acting on the toggle lever mechanism is dependent on the magnitude of the force acting on the cutting blade. The greater the force acting on the cutting blade, the greater the resultant force FR acting in the toggle lever mechanism.

In the dead center position, the force FR introduced by the force vector is transmitted to the toggle lever itself or to its supporting point. A deflection movement of the levers, or their buckling, is not possible without a further external influence. Only a force acting on the system which is not oriented in the direction of said force vector is capable of altering this state.

If the outer hinge points of the two toggle levers are connected to each other, a dead center position in the case of a non-supported toggle lever system can only be formed if the toggle joint is located exactly on this connection line. In a supported toggle lever system, the toggle joint can therefore lie—as seen in the deflection buckling direction—in front of said connection line.

In one exemplary embodiment of the invention having a toggle joint in front of the connection line—as seen in the deflection buckling direction—the toggle lever mechanism of the device according to the invention assumes the following positions with respect to the three aforementioned states:

In a first position (first buckling position), the toggle joint is overextended, in other words: The angle between the two toggle levers is greater than 180°. A lateral force acting in the pressure buckling direction presses the toggle lever mechanism against the provided limit stop.

In a second position (straight position), all three joints of the toggle lever mechanism are arranged on a common straight line. The angle between the two toggle levers is thus exactly 180°. A force introduced into the toggle lever mechanism has no lateral force components. The system finds itself in the dead center position.

In a third position (second buckling position), the angle between the toggle levers is less than 180°. A lateral force acting in the deflection buckling direction causes a buckling of the two toggle levers.

The cutting blade can assume two positions: In the operating position it is located within a conveyor channel provided on a harvester and cuts the harvested material that has been collected by the harvester and conveyed through the conveyor channel by means of a feed rotor. Its resting position is considered to be a position in which the cutting blade is preferably completely swiveled out of the conveyor channel and does not cut the harvested material at all, or only slightly (when the cutting blade is not completely swiveled out).

In the device according to the invention, the cutting blade is thus held by the toggle lever mechanism in its operating position not by means of a biasing force but rather by means of the existing self-locking effect. In order to cancel the self-locking effect, the dead center point must be passed, in other words: The toggle levers must be moved from the first buckling position through the straight position and into the second buckling position. To this end, the lateral force acting in the toggle joint must change its effective direction. This change in the position of the toggle levers and in the direction of force is made possible by the invention due to the interplay of a guide element with a spring element. The guide element is formed by a limit stop which is in contact with one of the two toggle levers. The stop is designed such that it represents a guide for the toggle lever, with the result that the toggle lever can slide or roll along on the stop.

With respect to the limit stop and guide, it can be provided for example, that the supporting structure of the toggle lever mechanism has a fixed bolt on which a toggle lever is supported by means of a guide track provided for support. The guide track thus forms a kind of inclined plane which can slide along the bolt when force is applied to the toggle lever mechanism. Conversely, it also possible for a fixed guide track to be coupled to the supporting structure and the toggle lever has a journal or bolt which slides along the fixed guide track when force is applied.

The guide track itself can be either rectilinear as well as completely or partially curved. A completely or partially curved guide track can for example offer advantages with respect to a jerk-free response or for controlling the release velocity.

Resulting from the load acting on the cutting blade is a force vector which acts on the toggle lever mechanism and which is partially—and in the dead center position, completely—introduced into the spring element. Due to the force introduced into the spring element, the latter changes in length. The change of length in the spring element causes the toggle levers to alter their position and their common rotational axis, wherein the change of position is mechanically forced by means of the guide element provided for this purpose. The toggle lever mechanism and the spring element rest against the guide element until the two toggle levers pass or have passed the dead center position.

The spring element can assume various embodiments. What is essential is that the spring element makes it possible for at least one of the elements of the toggle lever mechanism to change in length. A particularly preferred embodiment is one in which at least one of the two toggle levers consists of two parts which are coupled to one another by a spring element. When force is introduced in the direction of the spring element, the spring element is thus compressed, with the toggle lever being shortened in length accordingly. The same effect, namely a change of length, can also be achieved by other means besides employing a toggle lever with an additional spring element.

For example, an exemplary embodiment is also possible in which the toggle lever is made completely or partially from an elastic material, such as hard rubber. Further, it is also possible that it is not the toggle lever itself which makes a change in length possible, but rather a bearing position of at least one of the toggle lever joints. For this purpose, an elastic bushing could be integrated in the joint position which becomes deformed when force is applied. The change of length of the spring element when force is applied continues until the toggle lever rotational axis, whose movement is controlled by the guide element, is moved into said dead center position. This requires a predefined force F1, or such a force that can be predefined by the constructive design of the relevant elements.

When a minimum amount of additional force is introduced, an unstable position thus created can be overcome and the dead center point is passed.

After the dead center point has been passed, the toggle lever mechanism and the spring element no longer rest on the guide element. Resulting from the force introduced to the spring element up to this point is a biasing of the spring element, which is no longer supported after the dead center point has been passed, but which instead is suddenly released, causing the toggle levers to buckle into the second buckling position.

Particularly advantageous in this respect is that the cutting blade is supported against the overload protection device only as long as the toggle lever mechanism is in its over-extended position. A foreign object in the harvested material, such as a rock, therefore causes a type of impact on a cutting edge of a cutting blade. Once the dead center position has been passed, the spring element of the toggle lever mechanism therefore does not press against the cutting blade or against the rock located in front of the cutting blade. The cutting edge as a whole is protected, or at most is damaged in the limited area of impact or the point of first contact between the cutting blade and the rock.

It is furthermore advantageous that the engagement of the cutting blade from its resting position into its operating position can occur largely without resistance when the conveyor channel is empty. No spring has to be tensioned or preloaded against which the cutting blade is supported in its operating position. Instead, it is simply a matter of transferring the rotational axis of the toggle lever mechanism from the second buckling position through the dead center position and into the first buckling position. So long as the pivotal movement of the cutting blade about its rotation axis is not impeded by a force acting on the cutting blade, such as harvested material located in the conveyor channel, only frictional forces inherent in the system, for example in the swivel joints of the toggle lever mechanism, must be overcome in order to execute the pivotal movement.

In a preferred exemplary embodiment, the position of the limit stop can be adjusted with respect to the toggle lever. This also makes it possible to adjust the force which triggers the cutting blade overload protection device. The positioning of the limit stop with respect to the toggle lever mechanism defines the distance between the toggle lever rotational axis and the dead center position. If this distance is small, only a slight change in the length of the spring element is necessary for displacing the toggle lever rotational point beyond the dead center point as a result of a load acting on the cutting blade and thus triggering the blade protection device. Conversely, in the case of a relatively large distance, a greater change of length in the spring element and thus a greater force is required for triggering the blade protection device.

By virtue of the adjustability of the limit stop it is thus possible to predefine a force which triggers the blade protection device. This allows for the compensation of manufacturing tolerances in the production of the blade protection device so that the overload protection feature can be adjusted at the production site such that each single-blade protection device is released when a desired and predefined force is reached. Furthermore, the release point can also be reset or varied in order to adjust the overload protection feature to different harvesting conditions.

In order for the blade protection device to be triggered it is basically necessary for the limit stop to move relative to the toggle lever mechanism. During the phase in which the toggle lever mechanism is transferred by the load introduction from the first buckling position into the dead center position, the limit stop forms a guide for the movement of the toggle lever mechanism. The movement of the toggle lever in this phase is thus force-controlled by the limit stop serving as the guide element.

In a preferred exemplary embodiment, the toggle lever mechanism comprises a toggle lever having a contact region realized as a inclined plane. The inclined plane of the toggle lever can slide along the limit stop with as little resistance as possible. The limit stop itself and also the contact surface may have a coating which reduces wear and/or frictional resistance. Appropriate substances include for example lubricating oxides such as titanium oxide and molybdenum disulphide. For enhancing the slide properties, the limit stop can also have a rounded contour or a reel configuration.

In a preferred exemplary embodiment at least one of the toggle levers comprises two components that are connected to one another by the spring element. Here the spring element is integrated in the toggle levers such that it is arranged between the two components of the toggle lever, with the result that a force introduced into the toggle lever changes the length of the toggle lever in the region between its pivotal points. The length of the toggle lever is therefore dependent on the magnitude of a force acting on the toggle lever, and thus on the spring element. The change in length causes the toggle lever resting against the stop limit to slide along the stop limit, with the toggle lever rotational axis being mechanically forced out of the first buckling position into the dead center position and minimally beyond it.

As an alternative to an embodiment in which the spring element is integrated in a toggle lever, it is also possible for it to be arranged between the cutting blade and the toggle lever, or between a supporting frame connected to the toggle lever and the toggle lever. Further, it is possible for the spring element to be accommodated in the joint itself, for example in the form of an elastic plastic bushing, which is stuck on a bearing bolt, which in turn forms the bearing of a toggle lever: When a force acts on such a bearing position, the elastic plastic bushing is first compressed, thereby causing a change in length. It is essential that the constructive design is executed such that a change in the length of the spring element makes it possible for the toggle lever rotation axis to be mechanically shifted beyond the dead center point.

In a preferred exemplary embodiment, an elastic plastic block is provided as the spring element. Such a plastic block is very wear-resistant. The spring stiffness and spring characteristic curve can be preselected such that the change of length necessary for moving the toggle lever rotational axis beyond the dead center point can be realized with the selected material. Particularly preferred in this respect is the use of polyurethane as the material of the plastic spring.

However, as an alternative or a supplement to a plastic spring, it is also possible to use a rubber spring, a spiral compression spring or a spiral tension spring, a plate spring or another type of spring element.

In a further exemplary embodiment, the spring element comprises at least two individual springs. This offers in particular a number of advantages when a plastic compression spring is employed in a tight space. A tight space arises due to the fact that a short cutting length of the harvested material is desired for the cutting systems on which the blade safety device is employed and a large number of cutting blades are therefore spaced closely to one another.

Since the plastic compression spring bulges when it is impacted by a compressive force, problems arise if the installation space available between the individual blades is insufficient for the bulging out of an individual spring. In this case, the installation space required for the bulging out of the spring element can be reduced by arranging two or more compressive springs radially one behind the other and/or above one another on a common axis. Another advantage of using a plurality of individual springs is that when the spring axis does not coincide with the axis of the force vector, the springs can be arranged such that deflection can be realized without the formation of lateral forces acting in the spring.

A tensioning device can be provided for the spring element in order to apply a biasing force to it. Due to this biasing, the setting behavior of the spring element can be compensated. Furthermore, biasing ensures a secure installation of the spring element in the toggle lever mechanism and suppresses rattling noises. The biasing of the spring element discussed here is therefore not employed for preloading the cutting blade overload protection device against an overload acting on the cutting blade.

The spring element can be coupled to a guide means in order to prevent the spring element from breaking out laterally when subjected to a load. Such a guide means is particularly advantageous when a compression spring is used as the spring element, since in the case of such springs even insignificant lateral forces acting on a spring can trigger a lateral deflection under unfavorable circumstances.

In a preferred exemplary embodiment, the cutting blade overload safety device includes a restoring means which moves the cutting blade out of its resting position into its operating position. This restoring means is employed to shift the toggle lever rotational axis, and with it the toggle lever mechanism and the cutting blade as a whole, out of the second buckling position through the dead center point and back into the first buckling position. In order to return the cutting blade from its resting position to its operating position, any opposing forces in the conveyor channel acting on the cutting blade as well as the frictional resistance present in the toggle lever mechanism must be overcome. If the conveyor channel is empty, for example during transport of the harvesting machine, only the frictional resistance must be overcome in order to reset the blade. Such restoring means can be provided as a spring, for example, or a mechanism acting on the toggle lever joint, such as a cam shaft, whose cams press upon the toggle joint during rotation of the cam shaft and shift it out of the second buckling position through the dead center position and back into the first buckling position. The restoring means can be made of elastic rubber or plastic, such as a rubber band or fabric tape.

Particularly preferred is an embodiment in which a spiral spring or a roller spring is provided as the restoring means. Such a spring, whose one end is mounted at the toggle lever mechanism and its other end mounted at a fixed point opposite the toggle lever mechanism, such as one located on the supporting structure of the cutting frame, is preloaded when the cutting blade is deflected out of its operating position into its resting position. As soon as the restoring force of the spring is greater than the force counteracting the restoring movement, the cutting blade is automatically swiveled out of its resting position and back into its operating position in the conveyor channel. The spring force is preferably preselected to be merely somewhat greater than the frictional forces inherent in the system, with the result that the cutting blade can be swiveled into the conveyor channel when no or very little force is pressing against the blade in the conveyor channel.

Since the cutting blade is held in its operating position by the self-locking effect of the toggle lever mechanism and not by the restoring force of said restoring means, and since the biasing force of the spring element integrated in the toggle lever mechanism is significantly greater than the spring force of the restoring means after the toggle lever rotational axis has shifted across the dead center position, the cutting blade is moved out abruptly despite the tension exerted by the restoring means at the same time. The cutting blade is drawn out of the conveyor channel faster than the foreign object that has caused the disengagement, which is conveyed further in the conveyor channel and can thus slide along the blade edge. Thus, the use of a spring as a restoring means does not interfere with the effect that the foreign object contacting the cutting blade merely causes a kind of impact but does not damage any significantly large cutting area of the blade.

The cutting blade is on one hand pivotably coupled to a fixed supporting structure and can pivot about the cutting blade rotational axis opposite with respect to this supporting structure. On the other hand, it is coupled via a swivel joint to the toggle lever mechanism. In a preferred exemplary embodiment the bearing positions of the cutting blade rotational axis and/or toggle lever swivel joint have a predefined play. When a force acts on the cutting blade, resulting in torque being applied about cutting blade rotational axis, any play that is present between the components, particularly in the region of said joints, is thereby initially overcome and the components are pressed against one another at their respective points of contact.

When the appropriate play at the components has been preselected, this pressing together movement of the components contributes to the change in the resultant forces FR. In the interaction with the compression of the spring element integrated in the toggle lever mechanism, the magnitude and/or orientation of the resultant forces FR acting on the toggle lever mechanism can vary as a result of the introduction of the torque M about the cutting blade rotational axis. The selection of a predefined play thus contributes to attaining force F1 predefined for triggering the overload protection device due to the constructive design of the components.

Furthermore, the object is achieved by a harvester for leaf and stalk material having at least one cutting blade overload protection device and/or a toggle lever mechanism in one of the described embodiments.

BRIEF DESCRIPTION OF THE DRAWINGS

The invention is described in more detail in an exemplary embodiment and accompanying figures, where.

DETAILED DESCRIPTION OF PREFERRED EMBODIMENTS

Figure 1:
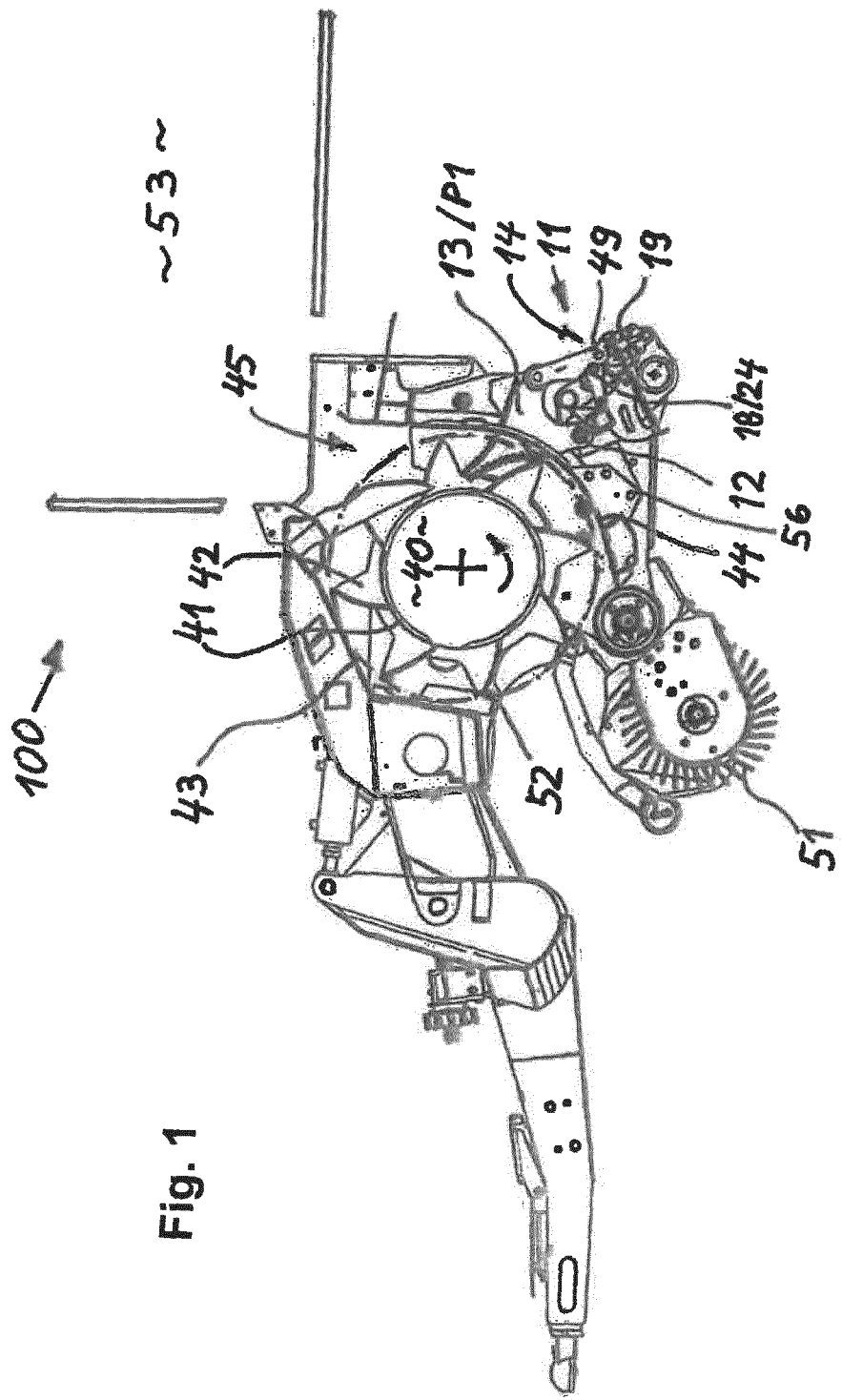
FIG. 1 shows a side view of the front section of a harvester.

Identical or similar elements in the following figures can be provided with identical or similar reference numbers. Furthermore, the figures of the drawing, its description as well as the claims contain numerous features in combination. Here it is clear to the person skilled in the art that these features can also be regarded individually, or they can be brought together in further combinations.

FIG. 1 shows a side view of the front part of a partially represented harvester 100 in the manner of a schematic cross-sectional diagram. The harvester 100 is an exemplary loader wagon, but the cutting blade overload protection device 10 can also be employed in other harvesters for leaf and stalk material, in particular in balers.

The harvester 100 has a reel 51 for picking up harvested material, for example grass. The harvested material (not shown) is fed by the reel 51 to a feed rotor 40 which comprises a supporting tube 41 and feed tines 42 attached thereto. In the shown exemplary embodiment, eight feed tines 42 form a feed tine star. The feed rotor 40 includes a plurality of such feed tine stars arranged next to each other axially to the rotational axis of the feed rotor 40. The feed tines 42, or feed tine stars, do not abut each other in the axial direction but instead are spaced apart, thus forming gaps though which the cutting blade 13 is guided during operation.

The feed tines 42 have tine tips 52 which define an external cylinder 43 of the feed rotor 40. A conveyor trough 44 extends around one part of the external cylinder 43. A conveyor channel 45 is thus formed between the supporting tube 41 of the feed rotor 40 and the conveyor trough 44. The harvested material fed during operations by the rotating reel 51 to the likewise rotating feed rotor 40 is fed by the feed tines 42 through the conveyor channel 45 to a loading space 53 of the harvester 100 following the conveyor channel 45.

The conveyor trough 44 has slit-like openings (not shown) arranged adjacent to one another and through which the cutting blades 13 extend into the conveyor channel 45 and project there into the gaps located between the feed tines. When the feed rotor 40 rotates, the feed tines 42 are thus guided along the cutting blades 13, with the feed tines 42 functioning as shear blades for the fixed cutting blades 13. The harvested material passing through the conveyor channel 45 is cut by the cutting blades 13, with the cutting length of the harvested material being defined by the spacing distance of the cutting blades 13.

The cutting blades 13 are coupled via blade holders 54 to a supporting structure 55 or support frame 31 and together form a cutting mechanism 11 that is pivotable about a rotational axis 56. When the cutting mechanism 11 is swung out, all cutting blades 13 are located outside of the conveyor channel 45.

Figure 2:
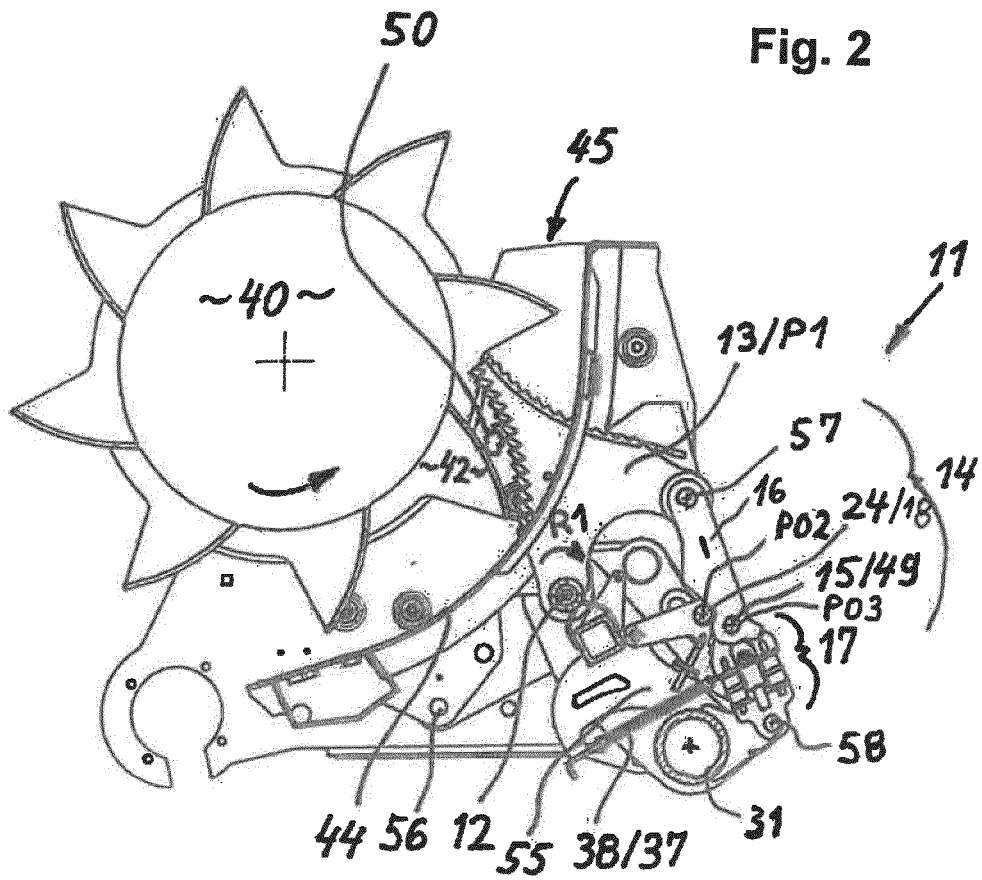
FIG. 2 shows part of the front section of FIG. 1 with a cutting blade in its operating position and the toggle lever mechanism in a first buckling position.

The cutting blades 13 can not only be swung in and out of the conveyor channel 45 together by means of the cutting mechanism 11, but can also be swung in and out of the conveyor channel 45 individually about a cutting blade rotational axis 12. The swing-out motion is made in the direction R2 as shown in FIG. 2, the swing-in motion in the opposite direction. The position of a cutting blade 13 swung into the conveyor channel 45 is designated as the operating position P1, the position when swung out of the conveyor channel 45 is designated as the resting position P2.

The swinging-out movement of a cutting blade 13 about the cutting blade rotational axis 12 is controlled by a toggle lever mechanism 14. This toggle lever mechanism 14 comprises the cutting blade overload protection device 10 according to the invention. The operating modes of the overload protection device 10 are illustrated in three "snapshots" of a first exemplary embodiment as shown in FIGS. 2 to 7.

FIG. 2 shows part of the harvester's front section with a cutting blade 13 completely immerged in the conveyor channel 45. The cutting blade 13—as well as the entire cutting mechanism 11—is thus situated in operating position P1. A foreign object 50, for example a stone, is located in the harvested material (not shown) in the conveyor channel 45. FIG. 2 shows the moment at which the foreign object 50 is located directly between a feed tine 42 and the cutting blade 13.

Figure 3:
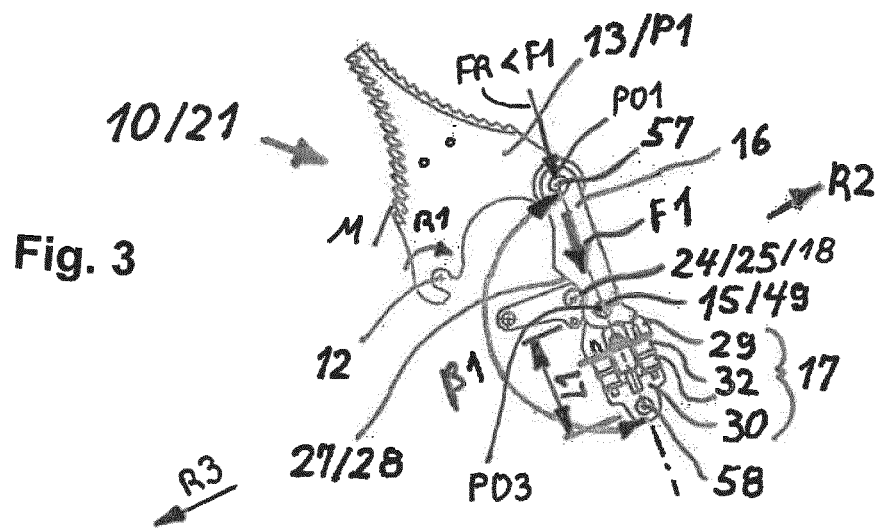
FIG. 3 shows the toggle lever mechanism of FIG. 2, first buckling position.

In FIG. 3, the toggle lever mechanism 14 from FIG. 2 is shown in a detached view for better visualization. The two toggle levers 16 and 17 have a common toggle lever swivel joint 49 with a toggle lever rotational axis 15. At its second end the toggle lever 16 is coupled to the cutting blade 13 by means of a swivel joint 57. Toggle lever 17 is coupled at its second end by a swivel joint 58 to the supporting structure 55 and has a length L1 between the swivel joints 49 and 58.

Toggle lever 16 rests against a limit stop 24 situated on the supporting structure 55. The limit stop 24 has a rounded contour 25 and forms a guide element 18 for the movement of the toggle lever 16. The two toggle levers 16 and 17 form an angle β1, which in the first exemplary embodiment shown in FIGS. 2 to 7 is greater than 180°. In the following, this position of the toggle lever mechanism will be designated as the first buckling position 21.

At the moment of contact between the foreign object 50 and the cutting blade 13, a torque M arises about the rotational axis 12 of the cutting blade 13 due to the rotation of the feed rotor 40. The force exerted on the blade is transferred to the components of the toggle lever mechanism. Torque M thus transfers the force acting on the cutting blade 13 to a contact point P01 of the cutting blade and toggle lever 16 or the toggle lever mechanism 14. The cutting blade rotational axis 12 is fixed in a permanent position, the contact point P01 represents a kind of satellite with respect to the stationary rotational axis 12. When force is transferred to point P01, any existing play between the components, particularly in the region of the joints, is overcome and the components are pressed against one another at their respective contact points. Resulting from the torque about the rotational axis 12 is thus a force vector FR, which is transferred via the swivel joint 57 to the toggle lever mechanism 14.

Since the toggle lever swivel joint 49 in the exemplary embodiment shown in FIG. 3 to FIG. 7 lies in front of the connection line of the swivel joints 57 and 58 as seen in the deflection buckling direction R2, the angle β1 is greater than 180°. The toggle lever mechanism 14 cannot buckle in the deflection buckling direction R2. The torque M applied about the rotational axis 12 is transferred as a resultant force FR to the contact point P01 located in region of the swivel joint 57 between cutting blade 13 and swivel joint 57. The force vector applied to the contact point P03 can also be designated as force vector FR". In an analogous manner, a force vector FR transferred to the contact point P02 of limit stop 24 and toggle lever 16 is designated as FR'. The force FR, as well as FR' and FR", can be broken down into a component force FN, which is transferred to the limit stop 24, and a component force FK, which is transferred through the toggle lever swivel joint 49 to the toggle lever 17 (see FIG. 10). The force FN can also be designated as a buckling force, since this force acts in the deflection buckling direction (direction R2) or in the pressure buckling direction (direction R3).

A spiral spring 38, which may be provided for retrieving the cutting blade from its resting position P2 to its operating position P1, has no load effect here. The blade protection device also functions without this spiral spring 38. Although the spiral spring 38 is preloaded when the cutting blade 13 is released from the operating position P1 into the resting position P2, the restoring force exerted by the spiral spring 38 is so small that it has no significant influence on the buckling force FN and the force required for triggering the cutting blade overload protection device 10

Figure 8:
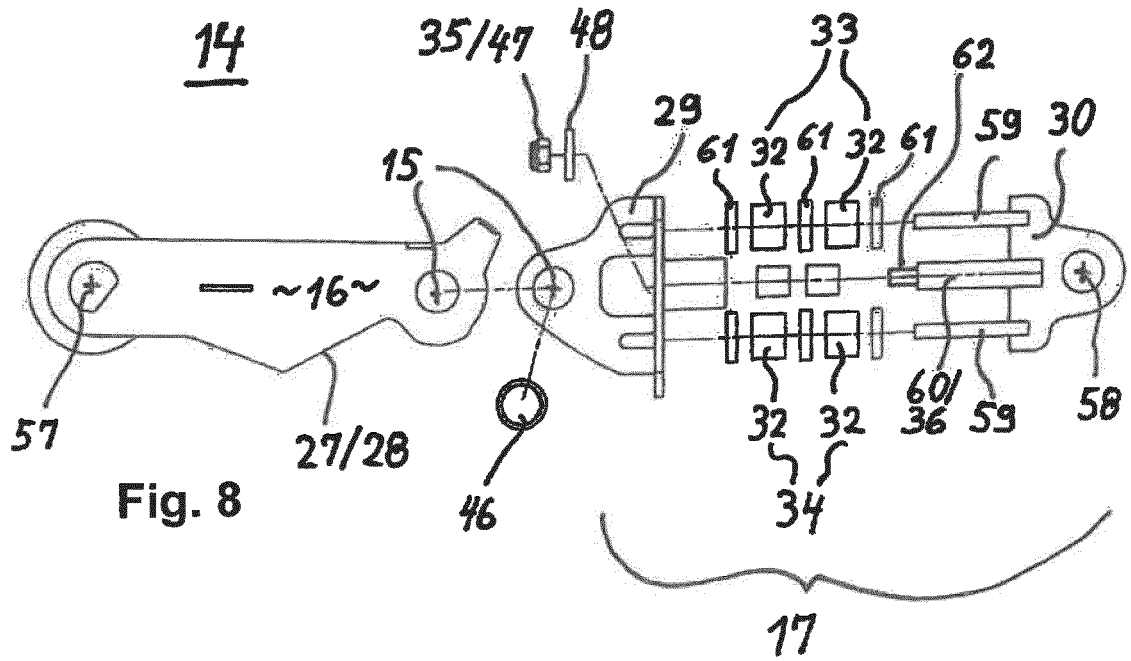
FIG. 8 shows an exploded view of the toggle lever components.
Figure 9:
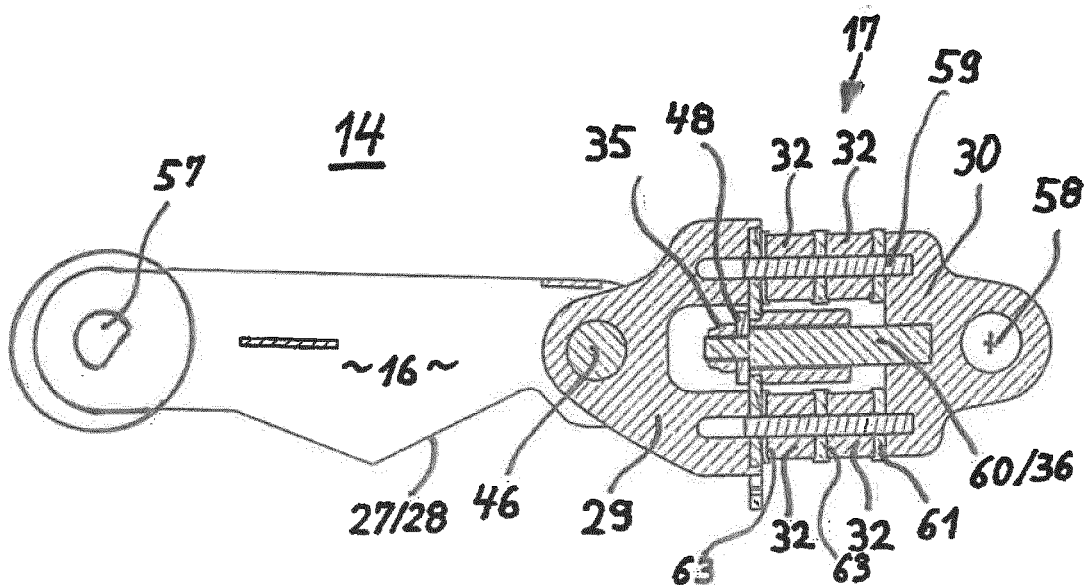
FIG. 9 shows the toggle lever mechanism in an assembled view.

The toggle lever mechanism 14 also has a spring element 19, which in the shown exemplary embodiments is integrated in the toggle lever 17. The two toggle levers 16 and 17 as well as the related components are shown in FIG. 8 and FIG. 9. The toggle lever 16 includes the two swivel joints 49 and 57 as well as an inclined plane 28, which forms a contact area 27 for the limit stop 24. The toggle lever 17 includes the two individual components 29 and 30 as well as two outer spring retaining bolts 59 and a middle spring guide bolt 60. The spring guide bolt 60 forms a guide means 36 and prevents a lateral bulging out of the spring element 19 when a load is applied.

In the shown exemplary embodiments, two cylindrical plastic blocks 32 are provided for each of the two spring retaining bolts 59 and can be attached to the spring retaining bolts 59 by means of a bore hole in the blocks. Two plastic blocks 32 form an individual spring 33 and two further plastic blocks 32 form an individual spring 34. Three spacer disks 61 can also be attached.

The shown embodiment with a plurality of spring retaining bolts 60 and respectively two plastic blocks 32 attachable thereto has the advantage that when the spring element 19 is compressed, not a single bulge is formed that would otherwise take up more installation space. Instead, the compression is uniformly transmitted to all plastic blocks 32 and each individual plastic block 32 bulges on its own, with the individual bulges of the four plastic blocks 32 provided in the exemplary embodiment being significantly smaller that the bulging of a larger single block—as an alternative to the four individual plastic blocks 32. In order to achieve a controlled bulging of the plastic blocks 32 in the central region, the spacer disks 61 have depressions 63 adapted to the ends of the plastic blocks 32. In their assembled state, the plastic blocks 32 are inserted in the depressions 63 and are thereby supported at their marginal regions. The depressions 63 can, for example, be screwed or embossed into the spacer disks 61.

The toggle lever 17 is held together in that the guide bolt 60 provided with a screw thread 62 is inserted in a bore hole provided in the toggle lever piece 29 and, after the insertion of a washer 48, is screwed on with a nut 47. Guide bolt 60 and nut 47 thus form a tensioning device 35. Depending on how far the nut 47 is screwed on the thread 62 of the guide bolt 60, the plastic blocks 32 are prestressed to a greater or lesser extent. By prestressing the plastic blocks 32, it is possible to compensate for the greater or lesser plastic setting behavior characteristic of the selected plastic. Furthermore, the prestressing represses bothersome rattling noises during transport of the harvester 100.

The washer 48 can in addition be configured as a damping element in order to reduce the noise and system stresses which occur when the spring element 19 springs back from a loaded position into its initial position.

The toggle lever 17 is thus an assembly in which the spring element 19 is integrated. Analogous to toggle lever 16, the toggle lever 17 has two swivel joints, namely a swivel joint 58 and—in common with toggle lever 16—the toggle lever swivel joint 49. The toggle lever swivel joints 49 of toggle levers 16 and 17 are coupled to one another by a hinge bolt 46 and share the toggle lever rotational axis 15.

Figure 4:
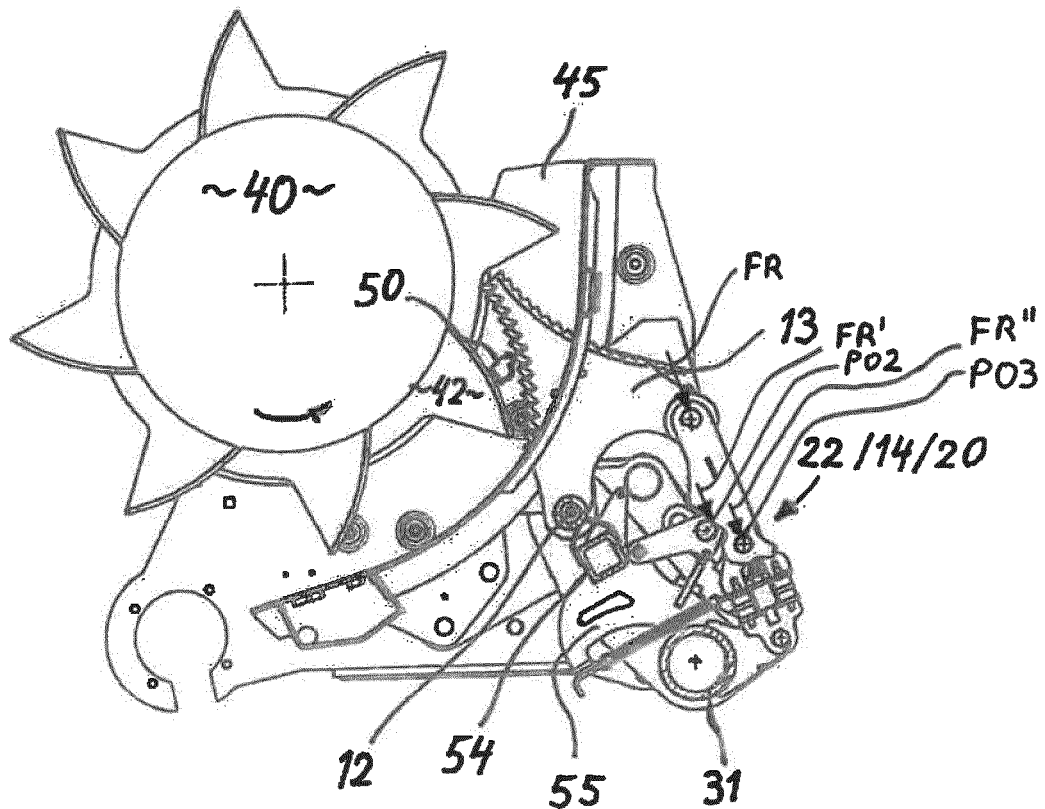
FIG. 4 shows a section of the front part of FIG. 1 when the cutting blade is moved out of its operating position, toggle lever mechanism at dead center position.

FIGS. 4 to 7 show the same exemplary embodiment as in FIG. 3. FIG. 4 shows the harvester front section with the toggle lever mechanism 14 in its straight position 22, while FIG. 5 in turn shows a detached view of the toggle lever mechanism of FIG. 4. In this exemplary embodiment, the three joints 49, 57 and 58 lie on a straight line 39. The angle $\beta 2$ of the two toggle levers 16 and 17 is 180°. This position represents a dead center position 20, in which the force acting on the toggle lever mechanism 14 is completely transmitted to the spring element 19.

Figure 5:
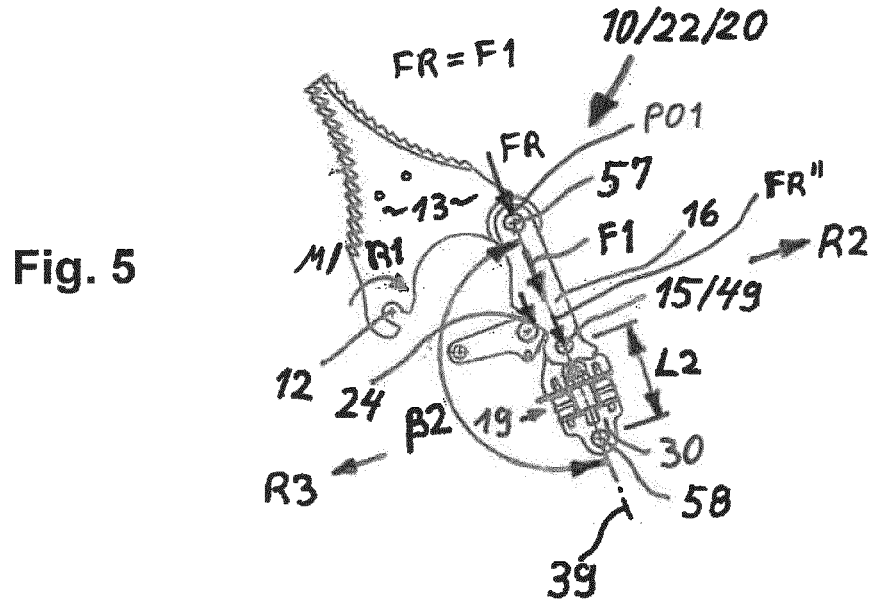
FIG. 5 shows the toggle lever mechanism of FIG. 4, dead center position.

As shown in FIG. 5 in particular, the force FR, or its force component FK, has compressed the spring element 19 and thus the toggle lever 17 to a length L2. Due to the compression of the toggle lever 17 and the force component FK of force vector FR exerted on the limit stop 24 during the compression, the direction of the force vector FR and/or the toggle lever 16, controlled by the inclined plane 28, is moved such that the toggle lever rotational axis 15 is shifted to the straight line 39 (see FIG. 5). The limit stop 24 and inclined plane 28 thus form a compulsory guide for the shifting of the toggle lever rotational axis 15.

Figure 6:
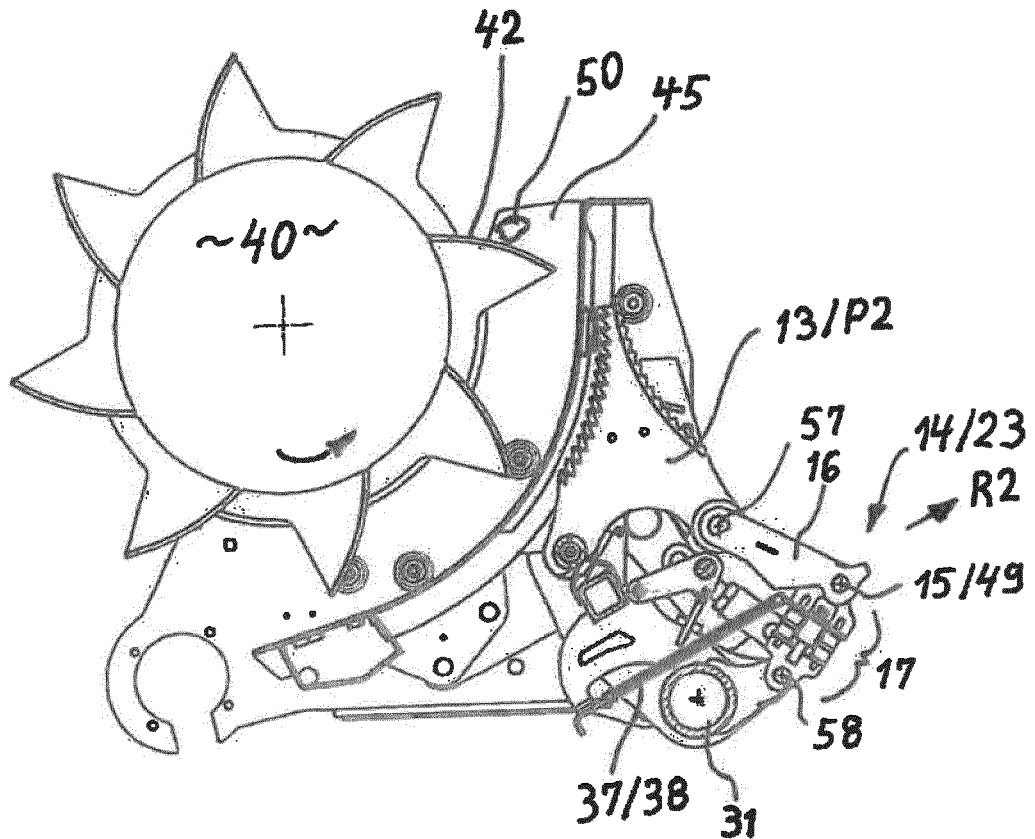
FIG. 6 shows a section of the front part of FIG. 1 with the cutting blade moved out into its resting position, toggle lever mechanism in a second buckling position.
Figure 7:
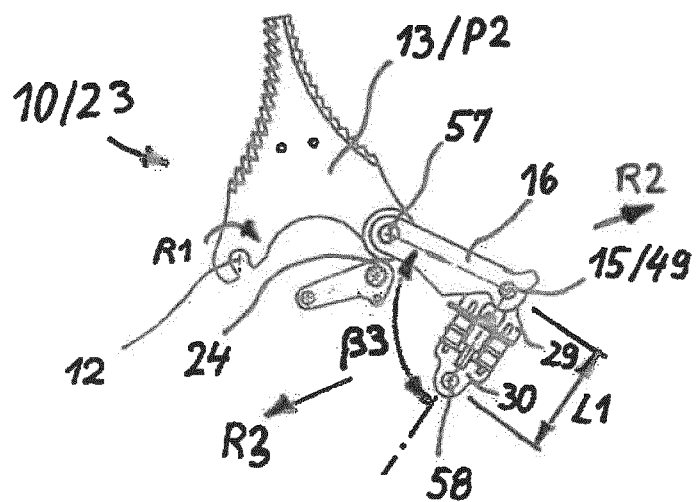
FIG. 7 shows the toggle lever mechanism of FIG. 6, second buckling position.

FIG. 6 shows the front section of the harvester with the toggle lever mechanism 14 in its second buckling position 23, while FIG. 7 shows the detached view of the toggle lever mechanism 14 of FIG. 6. The cutting blade 13 is located in a resting position P2 swung out of the conveyor channel 45. The cutting blade is not pressed out of the conveyor channel 45 by the foreign object 50 relatively slowly but is rather catapulted out of the conveyor channel 45 by the abruptly released energy of the previously compressed spring element 19 after the dead center point 20 has been passed.

The inclined plane 28 is thus sufficient for the toggle lever 16, and with it the toggle lever rotational axis 15, with the slightest additional application of force in the dead center position 20 to be guided beyond the dead center point. The triggering of the blade protection device is thus caused by a change of direction of the force component FN: In the case of a force acting on the cutting blade and causing a torque M, which causes a force FR to be exerted on the toggle lever mechanism 14 that is smaller than the predefined force F1, the resultant force FR acting on the toggle lever mechanism 14 has a force component FN acting in the pressure buckling direction R3. As the applied force increases, the magnitude of force FN decreases.

If the force FR acting on the toggle lever mechanism 14 achieves the predefined value F1, the buckling force acting in the direction R2 or R3 measures zero Newtons. A further increase in the force acting on the cutting blade 13, and thus an accompanying increase in the torque M as well as in the force FR acting on the toggle lever mechanism 14, causes the force component FN to reverse its effective direction from the pressure buckling direction R3 to the deflection buckling direction R2 and the cutting blade 13 is swung out of the operating position P1 into the resting position P2.

In the exemplary embodiment shown in FIGS. 2 to 7, the angle between the two toggle levers 16 and 17 is reduced, at first from the initial value present at the first buckling position 21, which is greater than 180° (overextended position), to 180° (dead center position) and upon passing the dead center position during the transition to a second buckling position 23 to less than 180°. Upon release, the spring element 19 and the counterforce to force vector FR resulting from its compression no longer exerts pressure in the direction R3, and thus against the cutting blade 13 in the tendency to keep the latter held in the conveyor channel 45. Instead, the spring element 19 lets the toggle lever mechanism 14 buckle without resistance about the toggle lever rotational axis 15 in the direction R2. The buckled position of the toggle lever mechanism 14 thus represents the second buckling position 23 in which the spring element 19 reverts to its relaxed initial position and the toggle lever 17 has again assumed its original length L1. After blade protection has been triggered, the angle $\beta 1$ present in the first buckling position 21 is reduced in the second buckling position to an angle $\beta 3$, which is significantly less than 180°, in the exemplary embodiment it has an angle of approximately 100°.

Also shown in FIG. 6 is that the position of foreign object 50 present in the harvested material (not shown) has not changed relative to the feed tines 42. After the cutting blade 13 has been swung out, the foreign object 50 is further conveyed along with the harvested material in the direction of the loading space 53, since the cutting blade 13 deflected out of the conveyor channel 45 has provided the necessary space for this. This is meant to illustrate that, after making contact with the cutting blade 13, the foreign object 50 is not scraped along the cutting blade of the latter but instead has provided that the cutting blade 13 is catapulted out of the conveyor channel 45.

In order to swing the cutting blade 13 counter to the direction R1 from its resting position P2 back into the conveyor channel 45 and thus into its operating position P1, the spring element 19 does not have to be compressed so long as no counterforce presses against the cutting blade 13. It is sufficient to introduce a slight force to the toggle lever mechanism 14 oriented in the direction R3 and the toggle lever swivel joint 49 is drawn by this force through the straight position 22 and back into the first buckling position 21. In the shown exemplary embodiment, this restoring force is supplied by a spiral spring 38 as the restoring means 37. The spiral spring 38 is coupled at one of its ends to the toggle lever mechanism 14 in the region of the toggle lever swivel joint 49 and at its other end to the supporting structure 55. As an alternative to a spiral spring, it is possible to provide a roller spring, a rubber band or an elastic band.

FIGS. 10 to 13 illustrate the cutting blade overload protection device 10 of the invention. The angle $\beta 1$ between the two toggle levers is greater than 180° and the two toggle levers assume an overextended position in operating position P1.

Thus, the angle $\beta 1$ in the first buckling position 21 can be greater than 180°.

The toggle lever mechanism 14 is guided out of a first buckling position 21 provided in operating position P1, through a dead center position and into the resting position P2, and thus into a second buckling position 23. The dead center position 20 is located in a straight position of the two toggle levers 16 and 17. The dead center position 20 is defined such that the buckling force at the dead center position measures zero Newtons. The rotational axis 15 of the toggle lever swivel joint 49 lies in the dead center position on the straight line 39.

Figure 10:
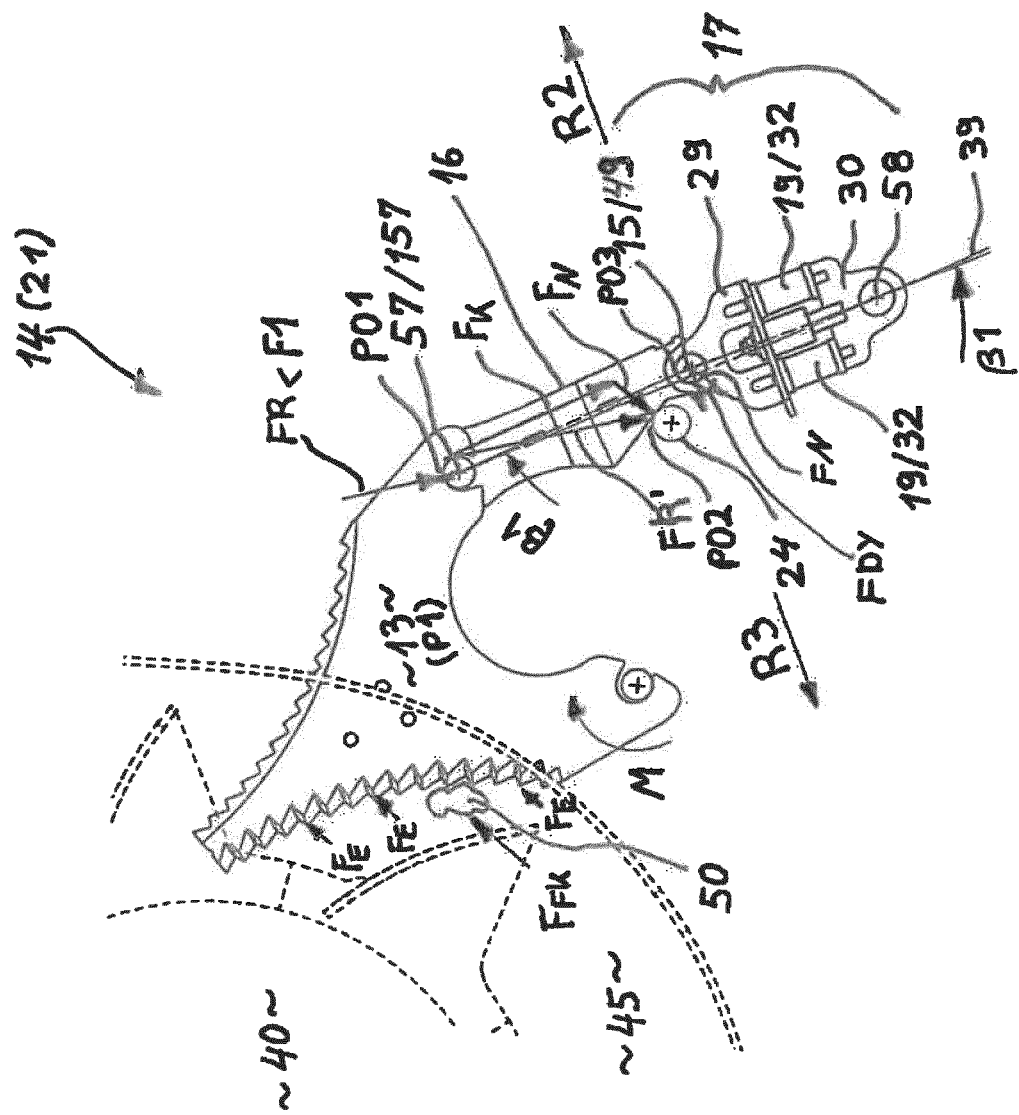
FIG. 10 shows a further example of a blade protection system with a toggle lever mechanism pressed against the limit stop, cutting blade in its operating position (first state)
Figure 11:
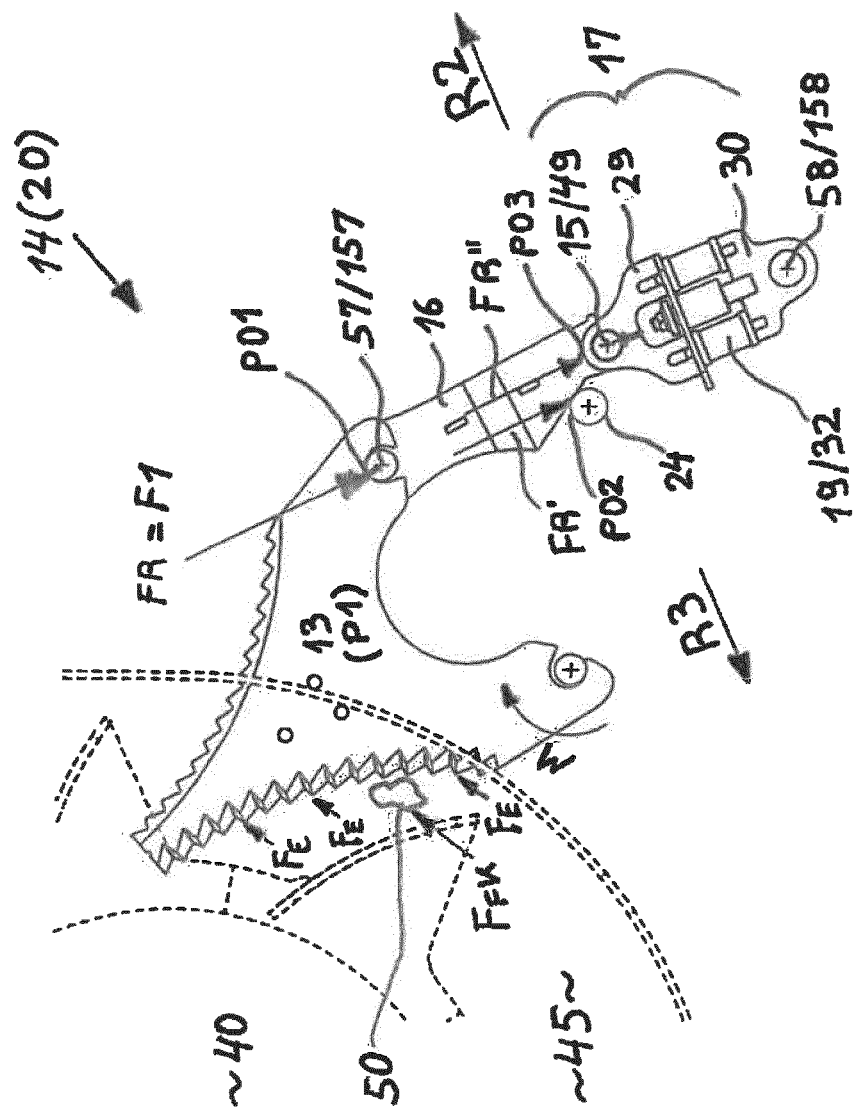
FIG. 11 shows the blade protection system of FIG. 10, with the toggle lever mechanism at the dead center position (second state)
Figure 12:
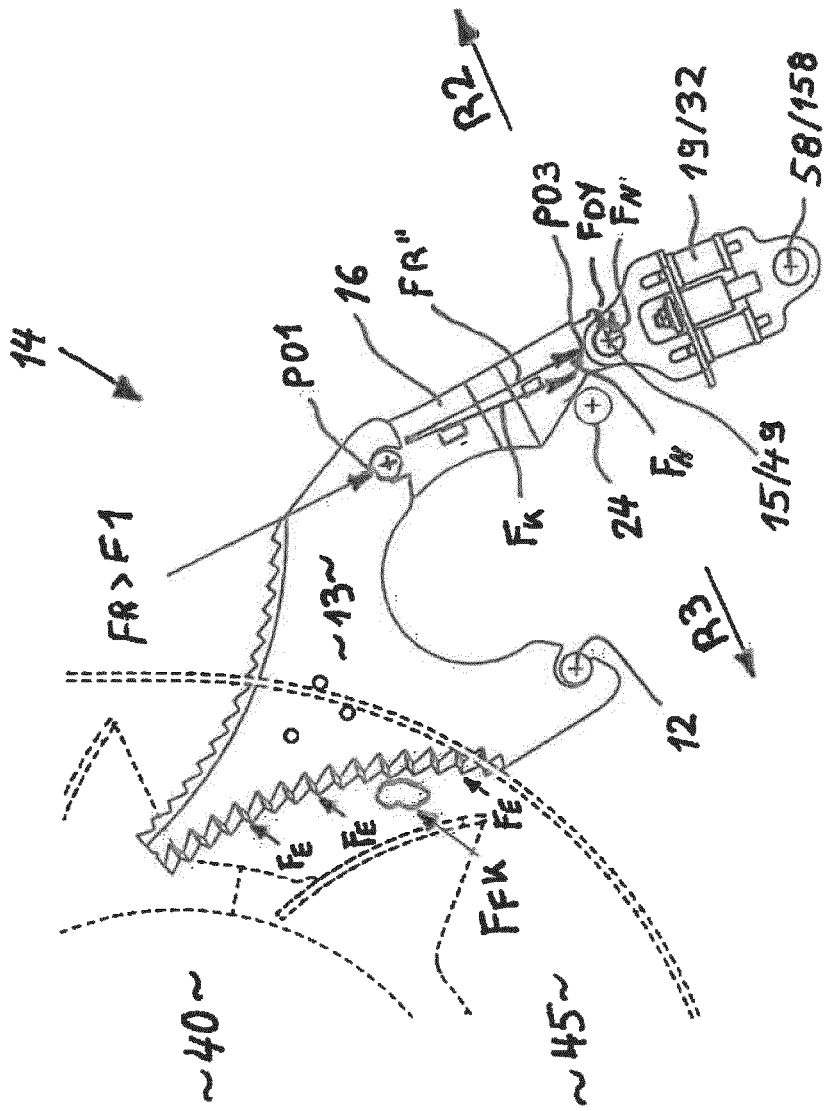
FIG. 12 shows the blade protection system of FIGS. 10 and 11, toggle lever mechanism immediately after passing the dead center position (third state)

FIGS. 10 to 13 also illustrate the forces acting in the toggle lever mechanism when different loads are applied on the cutting blade 13 in each case. During harvesting operations, the harvested material conveyed by the rotor 40 (see FIG. 1) in front of the cutting blade exerts a force FE on the cutting blade 13. In FIGS. 10 to 12, the force FE is indicated in the form of small force vectors which impact the cutting blade 13 on its cutting edge. Also shown is a foreign object 50 located in the harvested material (see also FIG. 2 and FIG. 4), which exerts a force FFK on the cutting blade. The forces FFK and FE together effect the torque M about the rotational axis 12 of the cutting blade 13. The torque M transfers a force FR to the toggle lever mechanism. The magnitude of force FR is thus dependent on the magnitude of torque M or the forces FFK and FE which give rise to the torque M.

FIG. 10 shows a schematic view of a first state in which the force FR acting on the toggle lever mechanism 14 is smaller than the predefined force F1 for triggering the cutting blade overload protection 10.

Inasmuch as a restoring means 37 is provided in the form of a return spring (indicated in FIG. 13), it exerts an additional force in the toggle lever swivel joint 49 acting in the direction R3. This restoring force, where appropriate, can be included and taken into account in the design of the components and the preselection, or predefinition, of the triggering force F1, with the result that the restoring force of the return spring exerts no disruptive influence on the triggering of the cutting blade overload protection device 10.

FIG. 11 shows a second state in which the force FR acting on the toggle lever mechanism 14 corresponds to the predefined triggering force F1. The force FR introduced to the toggle lever mechanism 14 by the torque M can be designated as force FR' at the points P02 and as force FR" at point P03. The system is in the dead center position 20. In this position, the total force FR is introduced to the toggle lever 17 as compression force and compresses the spring element 19.

FIG. 12 shows a third state in which the force FR acting on the toggle lever mechanism 14 is further increased and has exceeded the magnitude of the predefined release force F1. This third state is unstable and therefore passes to the fourth state shown in FIG. 13 without further action. The force FR now no longer has any counterbearing at point P02 and is not supported at this point. Instead, the force FR is transmitted as force FR" to the point P03 and the toggle lever swivel joint 49, and has a force component FDY directed in the deflection buckling direction R2. If no restoring means 37 are provided, or if no force is transmitted to the toggle lever swivel joint 49 by a restoring means acting in the direction R3, a minimal force component FDY oriented in the direction R2 is sufficient to trigger the cutting blade overload protection device 10. The triggering action is supported by the spring element 19, which is preloaded by the compression force FK and which relaxes when the dead center position 20 is passed. Here the energy stored in the spring element 19 is released abruptly, catapulting the cutting blade into its resting position P2.

Figure 13:
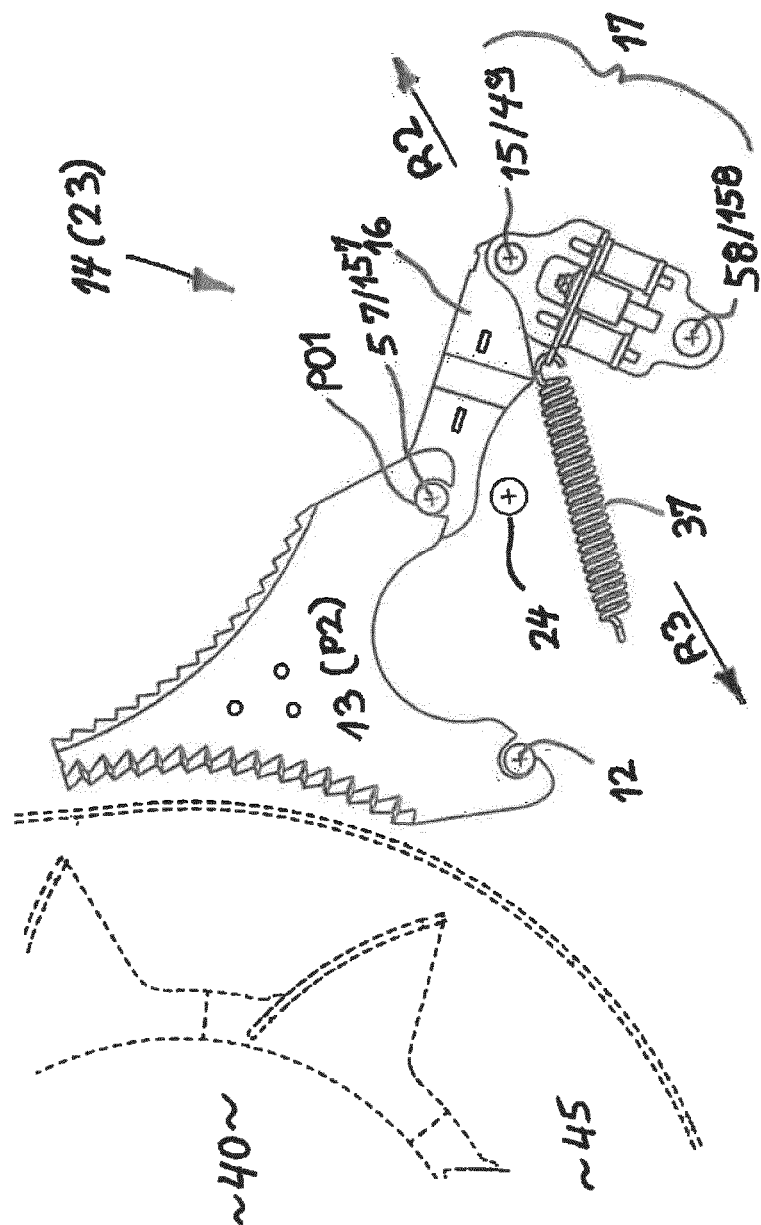
FIG. 13 shows the blade protection system of FIGS. 10 to 12, toggle lever mechanism completely moved out, cutting blade in its resting position.

FIG. 13 shows a fourth state in which the cutting blade 13 has been swung out of the conveyor channel and now assumes the resting position P2. The cutting blade 13 is not subjected to any load by either the harvested material or a foreign object. Inasmuch as no restoring means 37 is provided, no torque is exerted about the cutting blade rotational axis 12. If a restoring means 37 is provided, for example in the form of a spiral spring which acts on the toggle lever mechanism 14 in the region of the toggle lever swivel joint 49, torque is exerted about the cutting blade rotational axis 12, which swings the cutting blade 13 back into its operating position P1. In FIG. 13 such a restoring means is represented in an exemplary and suggestive manner. It can be seen that in the fourth state shown in FIG. 13, no force acts at point P01. Nor is there any force acting on the toggle lever swivel joint 49 and in the spring element 19. Instead, the entire toggle lever mechanism is in a relaxed position. In order to pivot the toggle lever swivel joint 49 in the direction R3, only the frictional forces inherent in the system must be overcome, or the system's components must be moved upward against the gravitational force exerted by these parts.

LIST OF REFERENCE NUMBERS 10 cutting blade overload protection device
11 cutting mechanism
12 cutting blade rotational axis
13 cutting blade
14 toggle lever mechanism
15 toggle lever rotational axis
16 toggle lever
17 toggle lever
18 guide element
19 spring element
20 dead center position
21 first buckling position
22 straight position
23 second buckling position
24 limit stop
25 contour
26 -
27 contact area
28 inclined plane
29 individual component
30 individual component
31 supporting frame
32 plastic block
33 individual spring
34 individual spring
35 tensioning device
36 guide means
37 restoring means
38 spiral spring
39 straight line
40 feed rotor
41 supporting tube
42 feed tine
43 external cylinder
44 conveyor trough
45 conveyor channel
46 hinge bolt
47 nut
48 washer
49 toggle lever swivel joint
50 foreign object
51 reel
52 tine tip
53 loading space
54 blade holder
55 supporting structure
56 rotational axis (of 11)
57 swivel joint (of 16)
58 swivel joint (of 17)

59 spring retaining bolt
60 guide bolt
61 spacer disk
62 screw thread
63 depression (in 61)
100 harvester
157 pivot axis (of 57)
158 pivot axis (of 58)
P1 operating position
P2 resting position
P01 contact point (of 13 and 16)
P02 contact point (of 24 and 16)
P03 contact point (of 16 and 17)
F force (acting on 14)
F1 force (triggering force)
FE force (exerted by harvested material)
FN force (buckling force)
FK force (compression force)
FFK force (exerted by foreign object 50)
FDY force (applied in 49)
FR force (resultant force in P01)
FR' force (resultant force in point P02)
FR" force (resultant force in point P03)
L1 length
L2 length
M torque (about 12)
R1 direction
R2 direction
R3 direction
β1 angle in first buckling position 21
β2 angle in straight position 22
β3 angle in second buckling position 23

The invention claimed is:

1. A toggle lever mechanism (14) comprising:
two toggle levers (16, 17) that are coupled to one another and pivotable about a toggle lever rotational axis (15) and which are movable from an operating position (P1) to a resting position (P2) when a predefined force (F1) acting on the toggle lever mechanism (14) has been exceeded;
a limit stop (24); and
a spring element (19),
wherein the limit stop (24) forms a guide element (18) which is in contact with a toggle lever (16, 17) and the toggle lever (16, 17) contacting the limit stop (24) includes a guide track in the form of an inclined plane (28) along which the limit stop (24) can slide or roll, with the spring element (19) and the limit stop (24) interacting such that when the predefined force (F1) is exceeded, the toggle lever rotational axis (15) is moved past a dead center point (20) and the position of the toggle lever (16, 17) shifts from a first buckling position (21) to a second buckling position (23).

2. A cutting blade overload protection device (10) for a cutting mechanism (11) of a harvester (100) for leaf and stalk material, comprising:
at least one cutting blade (13) that is pivotable about a cutting blade rotational axis (12); and
a toggle lever mechanism (14) as claimed in claim 1 with which the cutting blade (13) is movable from an operating position (P1) to a resting position (P2) when a predefined force (F1) has been exceeded.

3. The cutting blade overload protection device (10) as claimed in claim 2, wherein a force (FR) acting on the toggle lever mechanism comprises a buckle force component (FN) and a compression force component (FK) and:

when the cutting blade (13) is in operating position (P1), the buckle force component (FN) presses the toggle lever mechanism (14) against the limit stop (24) in direction (R3);
as force (FR) increases, the buckle force component (FN) oriented in direction (R3) is reduced;
upon attaining the predefined value (F1), force (FR) moves the toggle lever mechanism into the dead center position (20) in which a force (FDY) or (FN) acting in toggle lever swivel joint (49) measures zero Newtons; and
when force (FR) exceeds the predefined value (F1), said force (FR) moves the toggle lever swivel joint (49) away from the limit stop in direction (R2), with the result that the dead center position (20) is passed and the cutting blade overload protection device (10) triggered by the passing of the dead center position (20) moves the cutting blade (13) into resting position (P2).

4. The cutting blade overload protection device (10) as claimed in claim 2, wherein when changing from the operating position (P1) into the resting position (P2), the toggle lever mechanism (14) passes out of the first buckling position (21) through a straight position (22) and into the second buckling position (23).

5. The cutting blade overload protection device (10) as claimed in claim 2, wherein the position of the limit stop (24) is adjustable with respect to the toggle lever (16).

6. The cutting blade overload protection device (10) as claimed in claim 2, wherein the toggle lever (16) includes a contact area (27) that is configured as an inclined plane (28).

7. The cutting blade overload protection device (10) as claimed in claim 2, wherein the toggle lever (16, 17) comprises individual components (29, 30) which are coupled to one another by means of the spring element (19) such that the length (L1; L2) of the toggle lever (17) is dependent on the magnitude of force (FR) and thus on the magnitude of the force (FK) acting on the spring element (19).

8. The cutting blade overload protection device (10) as claimed in claim 2, wherein the spring element (19) is arranged between the cutting blade (13) and the toggle lever (16) or between a supporting frame (31) connected to the toggle lever (17) and the toggle lever (17).

9. The cutting blade overload protection device (10) as claimed in claim 2, wherein:
a first of the two toggle levers (16) comprises at an end opposite the toggle lever rotational axis (15) a first swivel joint (57) with a first pivot axis (157); and
a second of the two toggle levers (17) comprises at an end opposite the toggle lever rotational axis (15) a second swivel joint (58) with a second pivot axis (158);
the two toggle levers (16, 17) include a common swivel joint (49) with the toggle lever rotational axis (15); and
at least one of the swivel joints (49, 57, 58) includes the spring element (19), which is elastically deformed when a force (FR) acts on the toggle lever mechanism (14).

10. The cutting blade overload protection device (10) as claimed in claim 2, wherein an elastic plastic block (32) is provided as the spring element (19).

11. The cutting blade overload protection device (10) as claimed in claim 2, wherein the spring element (19) includes at least two individual springs (33, 34).

12. The cutting blade overload protection device (10) as claimed in claim 2, further comprising a tensioning device (35) for preloading the spring element (19).

13. The cutting blade overload protection device (10) as claimed in claim 2, wherein the spring element (19) is coupled to a guide means (36) in order to prevent the spring element (19) from breaking out laterally when subjected to a load.

14. The cutting blade overload protection device (10) as claimed in claim 2, further comprising a restoring means (37) for moving the cutting blade from the resting position (P2) into the operating position (P1).

15. A harvester (100) for leaf and stalk material, comprising at least one of:
   at least one cutting blade overload protection device (10) as claimed in 2; and
   a toggle lever mechanism as claimed in claim 1.

\* \* \* \* \*